United States Patent Office 3,396,800
Patented Aug. 13, 1968

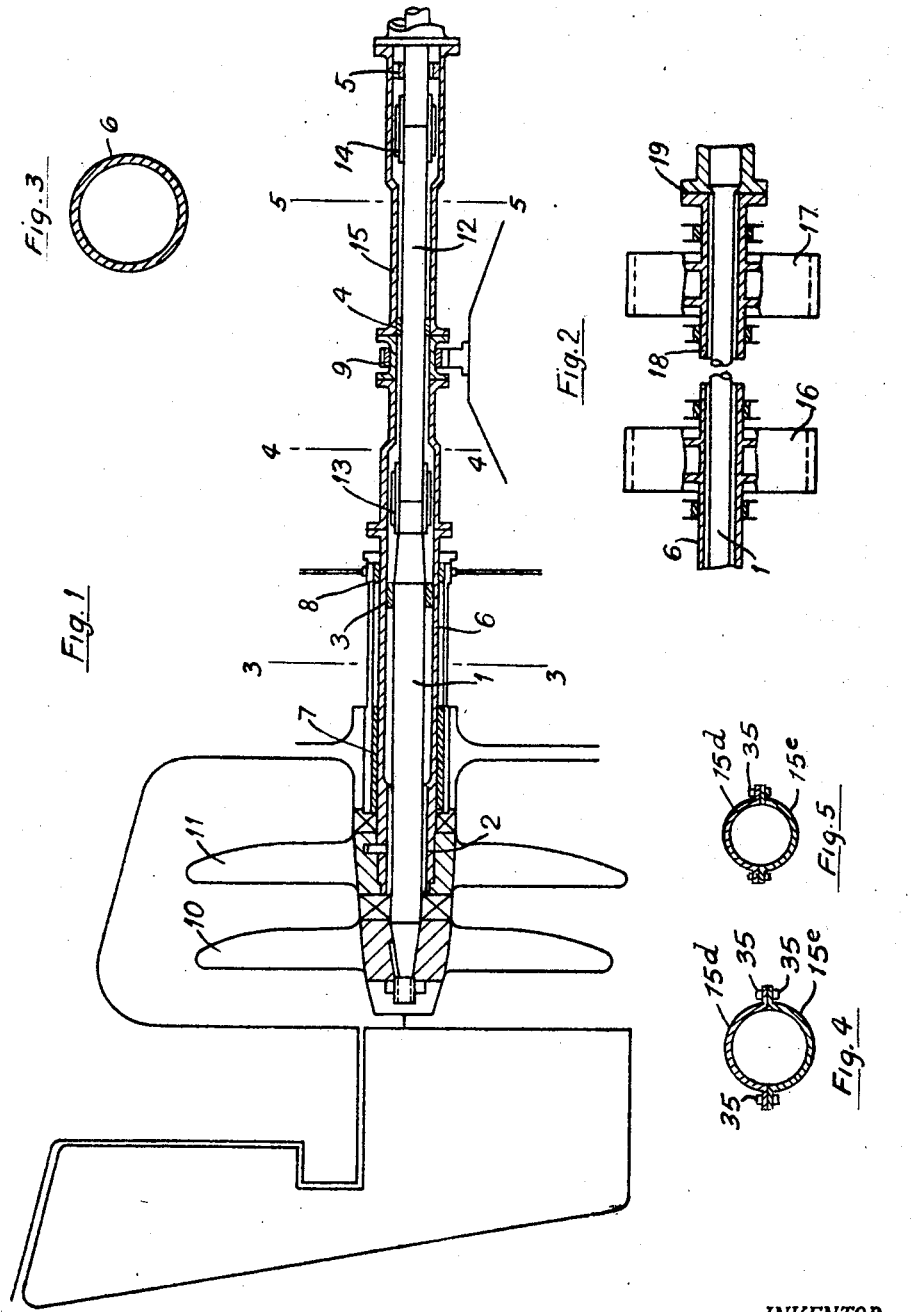

3,396,800
ARRANGEMENT IN SEA - GOING VESSELS DRIVEN BY TWO COUNTER-ROTATING PROPELLERS
Oscar Hilding Hillander, Malmo, and Ingvar Karl Einar Jung, Finspong, Sweden, assignors to Stal-Laval Turbin AB, Finspong, Sweden
Filed Oct. 27, 1966, Ser. No. 589,965
Claims priority, application Sweden, Dec. 9, 1965, 15,999/65
2 Claims. (Cl. 170—135.28)

ABSTRACT OF THE DISCLOSURE

An arrangement for use in sea-going vessels and especially those employing two co-axially situated propeller shafts. In this arrangement the propeller shafts each consist of detachable portions disposed in end-to-end relationship and the outer shaft, which is hollow, is split or divided longitudinally, at least for a substantial portion of its length, so that by removing one half of the split portion of said outer shaft, access will be obtained to a coupling and journal of the inner shaft.

---

This invention relates to an arrangement adapted for use in sea-going vessels and especially those having two co-axially situated propeller shafts, one of which is located inside of the other with the outermost shaft being in tubular form. The invention is characterized in that the shafts each consist of detachable portions arranged in series or end-to-end, of which portions a part of the outer shaft is split or divided longitudinally or along an axial plane into two halves so that by first removing one half, access will be obtained to the coupling and journal of the inner shaft. Secondly, the portions of said inner shaft can therefore be easily removed and replaced. By means of this arrangement, the inner shaft can be dismantled without it becoming necessary to move the same rearwardly or toward the stern of the vessel, which might necessitate the removal of the rudder. Furthermore, the present invention also permits the said shaft to be removed while the ship is in dry dock, where there is often insufficient space to allow the shaft to be removed rearwardly. The described construction also enables the bearings and couplings to be easily reached for inspection purposes.

With these and other objects to be hereinafter set forth in view, we have devised the arrangement of parts to be described and more particularly pointed out in the claims appended hereto.

In the accompanying drawing, wherein an illustrative embodiment of the invention is disclosed, FIG. 1 is a longitudinal sectional view of the shafts and propellers of a vessel as constructed according to the present invention; and FIG. 2 shows a pinion arrangement as applied to the shafts.

FIG. 3 is a sectional view, taken substantially on the line 3—3;

FIG. 4 is a sectional view, taken substantially on the line 4—4 of FIG. 1, and

FIG. 5 is a sectional view, taken substantially on the line 5—5 of FIG. 1.

Referring to the drawing, 1 indicates an inner propeller shaft that is journalled in the bearings 2 and 5 and within an outer, tubular or hollow shaft 6 that is journalled in the bearings 7 and 9. The shafts respectively support contra-rotating propellers 10 and 11. The inner shaft 1 has a connected portion 12 constituting a longitudinal extension of the part 1, said portion 12 and a similar portion forwardly of it being connected by coupling sleeves 13 and 14 which maintain the ends of these portions of the inner shaft in abutment and in such a manner that torque can be transmitted solely by friction. When assembling and dismantling these couplings, pressure oil is introduced between the abutment surfaces, frictional abutment thus ceasing, permitting the coupling sleeves to be displaced axially. This coupling, which is known per se, occupies only a small space and is thus particularly well suited for use in the manner described.

The outer shaft 6 includes a connected portion 15 which may be attached to the end of the shaft 6 by means of flanges and bolts extending through the same. This shaft portion or portions 15, which enclose the inner shaft portions 12, is split or longitudinally divided along an axial plane, into two halves 15d and 15e which are bolted together by bolts 35 shown in FIGS. 4 and 5. Several of the sections 15 may be joined end-to-end to provide an outer shaft of the required length. The part 6 of the outer shaft that is mounted in the bearings 7 and 8 need not be longitudinally split as will be apparent from FIG. 3. The propellers are removed and parts of the inner shaft exposed in the following manner:

The propeller on the inner shaft 1 is first removed, said propeller being that indicated at 10. The upper half of the bearing 9 is then removed and one-half of portion 15 of the outer shaft is loosened and separated from the other half of the outer shaft. The couplings 13 and 14 are then loosened and portion 12 and any similar portions forwardly of the part 12 can be lifted out. The propeller arrangement can be re-assembled by reversal of the above procedure.

In FIG. 2 each of the shafts is shown as being driven by a pinion 16, 17 respectively of which the forward pinion 17 is supported by a tubular portion 18 of the shaft, the said portion 18 being connected to the shaft 1 by means of a coupling 19. On dismantling, the halves of the coupling 19 are loosened, after which the leading portion of the shaft 1 can be moved forwardly somewhat while the coupling 14 is being released. Thus, in this manner, sufficient space is obtained to remove the shaft portion 12. Subsequent to removing the one half of the coupling 19, which is secured to the shaft 1, forward shaft portion can also be removed in the same manner as the other portions of the shaft. A further advantage is that either or both of the pinions 16 and 17 can be removed.

Having thus described an embodiment of the invention, it is obvious that the same is not to be restricted thereto, but is broad enough to cover all structures coming within the scope of the annexed claims.

What is claimed is:

1. In a propeller arrangement for a vessel, two co-axially located propeller shafts, one of said shafts being concentrically located within the other, each of the shafts being composed of a plurality of sections united in end-to-end relation, the outermost shaft having a portion supported adjacent to its ends in bearings, said outermost shaft having another portion located beyond said bearings and being longitudinally divided into half sections whereby one of said half sections can be separated from the other section to expose parts of the innermost shaft and permit the removal of the same from within the outermost shaft, the sections of the innermost shaft being united by couplings, and portions of said innermost shaft and the couplings are rendered accessible by the removal of one half of the part of the outer shaft along its longitudinal separation line, a propeller carried on the inner shaft end rotative in one direction and a propeller on the outer shaft rotative in the opposite direction.

2. A vessel according to claim 1, wherein the propellers are located adjacent to the portion of the outer shaft that is supported between the two bearings and that said portion of the outer shaft is not longitudinally split.

References Cited

UNITED STATES PATENTS

| | | | |
|---|---|---|---|
| 2,347,906 | 5/1944 | Hacher | 170—135.28 X |
| 2,350,942 | 6/1944 | Tarn. | |
| 2,480,806 | 8/1949 | Desmoulins | 170—135.28 |
| 2,775,104 | 12/1956 | Karcher | 64—1 X |
| 3,167,361 | 1/1965 | Snapp et al. | |

EVERETTE A. POWELL, JR., *Primary Examiner.*